Patented June 6, 1950

2,510,166

UNITED STATES PATENT OFFICE 2,510,166

COATED CELLULOSE PROPIONATE MATERIAL AND A LACQUER THEREFOR

Alan P. Baruch, Newark, and Ralph E. Porzer, Bloomfield, N. J., assignors to Celanese Corporation of America, a corporation of Delaware No Drawing. Application November 29, 1946, Serial No. 713,082

5 Claims. (Cl. 106—185)

This invention relates to lacquers and relates more particularly to lacquers adapted to be employed for the coating of films, foils and molded articles having a basis of cellulose propionate.

An object of this invention is the provision of an improved lacquer composition suitable for the application of a clear or pigmented coating to cellulose propionate materials.

Another object of this invention is the provision of a lacquer for the coating of cellulose propionate materials which does not attack the surface of the cellulose propionate material during the lacquering operation.

A further object of this invention is the production of cellulose propionate materials coated with a lacquer composition producing a strongly adherent, blush-resistant coating on the surface of the cellulose propionate base material.

Other objects of this invention will appear from the following detailed description.

Although cellulose propionate films, foils, molded articles or extruded shapes normally possess a high natural lustre or polish, it is frequently desirable to apply a lacquer coating thereto by brushing, spraying or dipping operations to produce a particular decorative design or effect on part or all of the surface of the material being coated. Such a lacquer coating must, of course, be compatible with the cellulose propionate base material and adhere tenaciously thereto. At the same time the volatile solvents employed as the vehicle for the lacquer composition must not affect the cellulose propionate material being coated to produce undesirable surface changes such as, for example, an unmolding of the surface due to solvent action thereon, especially in the case of injection-molded articles.

We have found that a smooth, strongly adherent, blush-resistant lacquer coating may be applied to cellulose propionate materials without producing any undesirable surface attack thereon by employing a lacquer composition comprising cellulose nitrate of ½ to 25 second viscosity or more dissolved in a mixture of suitable volatile solvents which has substantially no solvent action on the cellulose propionate composition. In accordance with our invention, the mixture of volatile solvents employed comprises a medium boiling solvent for cellulose nitrate, such as amyl acetate, butyl acetate, secondary butyl acetate, or the mono-ethyl or mono-methyl ether of ethylene glycol, a diluent for the medium boiling solvent which is also a latent solvent for the cellulose nitrate, such as a lower aliphatic alcohol, and a non-solvent diluent comprising a mixture of aliphatic or petroleum hydrocarbons. The lower aliphatic alcohol solvent diluent may be butyl alcohol, amyl alcohol, secondary butyl alcohol, isopropyl alcohol or propyl alcohol, while the non-solvent diluent mixture of aliphatic or petroleum hydrocarbons may contain mineral spirits, mixed naphthas, or those petroleum hydrocarbon mixtures sold commercially as naphthas under the name of "Lactol Spirits," "Textile Spirits," and "V. M. and P." naphtha. "Lactol Spirits" is a petroleum hydrocarbon fraction having a distillation range of 93 to 130° C., an A. P. I. gravity of 62.0 at 60° F., a specific gravity of 0.7313 at 60° F., a kauri butanol number of 38.0, an aniline point of 125° F. and a nitrocellulose dilution ratio of 1.40. "Textile Spirits" is a petroleum hydrocarbon fraction having a distillation range of 60 to 99° C., an A. P. I. gravity at 60° F. of 70.5, a specific gravity at 60° F. of 0.7005, a kauri butanol number of 33.5, an aniline point of 135° F. and a nitrocellulose dilution ratio of 1.30. "V. M. and P." naphtha is a petroleum hydrocarbon fraction having a distillation range of 101 to 146° C., an A. P. I. gravity at 60° F. of 55, a specific gravity at 60° F. of 0.73, a kauri butanol number of 35, an aniline point of 125° F. and a nitrocellulose dilution ratio of 1.30.

The total amount of solvents employed will vary depending on the viscosity of the cellulose nitrate and the method of application of the lacquer composition, i. e. whether by dipping, brushing, spraying, etc. Thus, for example, employing 100 parts by weight, on a dry basis, of a cellulose nitrate of ½ second viscosity, a suitable solvent mixture comprises about 350 to 700 parts by weight, say 450, of the medium boiling solvent, about 350 to 700 parts by weight, say 450, of the lower aliphatic alcohol solvent diluent and about 300 to 500 parts by weight, say 375, of the mixed aliphatic or petroleum hydrocarbon non-solvent diluent. Where cellulose nitrates of a higher viscosity are employed, increased amounts of the solvent mixture are necessary in order to obtain a lacquer which may be applied conveniently by brushing or spraying. Normally, the cellulose nitrate employed is in the form in which it is sold in commerce, containing ethyl alcohol in an amount of from 30 to about 50 parts by weight for each 100 parts by weight of cellulose nitrate. This amount of ethyl alcohol may be tolerated safely in forming the lacquer composition of this invention but no additional ethyl alcohol should be employed.

For various decorative effects the novel lacquer composition may contain pigments, dyestuffs or any other suitable coloring material, flatting agents such as diatomaceous earth, aluminum stearate, etc., to produce a matte effect, if desired, or pearl essence to impart iridescence. The lacquer may also contain fluorescent and phosphorescent materials to produce special luminescent effects. Other ingredients such as resins or waxes, preferably in small amounts, may also be employed to achieve better adhesion, moisture-proofing, etc. The use of plasticizers in the lacquer composition is generally undesirable as they may cause plasticizer migration in the article being coated as well as tackiness in the lacquer coating. The cellulose nitrate coating may itself be coated with a thin layer of an organic derivative of cellulose containing an ultra-violet light absorber such as phenyl salicylate, quinine bisulfate or fluoranthrene to prevent yellowing of the cellulose nitrate coating.

In order further to illustrate our invention, but without being limited thereto, the following examples are given:

Example I

A cellulose propionate molding composition of the following formula is employed:

| | Parts by weight |
|---|---|
| Cellulose propionate (0.3 free hydroxyl) | 100 |
| Dibutyl sebacate | 12 |
| Butoxyethyl stearate | 3 |

This composition is injection molded and the molded articles obtained are dip-coated with a clear lacquer of the following composition:

| | Parts by weight |
|---|---|
| Cellulose nitrate (½ sec. viscosity) | 100 |
| Ethyl alcohol (associated with cellulose nitrate) | 50 |
| Butyl alcohol (normal) | 450 |
| Sec. butyl acetate | 450 |
| "Lactol Spirits" | 385 |

No solvent attack is observed and the lacquer coating produced is clear and transparent. When the coated articles are exposed for 96 hours to 90% relative humidity and a temperature of 100° F., and then for 24 hours to 100% relative humidity at 120° F., no blushing or migration of plasticizer from the cellulose propionate base material is observed. The adhesion remains entirely satisfactory without tackiness.

Example II

A cellulose propionate molding composition of the following formula is employed:

| | Parts by weight |
|---|---|
| Cellulose propionate (0.5 free hydroxyl) | 100 |
| Dibutyl phthalate | 16 |
| Butoxyethyl stearate | 4 |

This composition is subjected to extrusion molding operations and the extruded articles obtained are dip-coated with a clear lacquer of the following composition:

| | Parts by weight |
|---|---|
| Cellulose nitrate (20 second viscosity) | 100 |
| Ethyl alcohol (associated with the cellulose nitrate) | 35 |
| Amyl acetate | 800 |
| Amyl alcohol | 800 |
| "Textile Spirits" | 650 |
| Phenyl salicylate (Salol) | 3 |

The lacquer coating applied is clear and transparent and no solvent attack is observed. On being subjected to the humidity test set forth in Example I, no blushing or plasticizer migration from the cellulose propionate base material is observed and the coating remains firmly adherent to the cellulose propionate base material.

Example III

Discs are injection-molded of the following cellulose propionate molding composition:

| | Parts by weight |
|---|---|
| Cellulose propionate (0.2 free hydroxyl) | 100 |
| Dibutyl sebacate | 10 |

The discs produced are then dip-coated with a clear lacquer of the following composition:

| | Parts by weight |
|---|---|
| Cellulose nitrate (½ sec. viscosity) | 100 |
| Ethyl alcohol (associated with cellulose nitrate) | 50 |
| Mono-ethyl ether of ethylene glycol | 450 |
| Butyl alcohol | 450 |
| "V. M. and P." naphtha | 300 |

A clear, transparent coating of cellulose nitrate is formed on the coated discs. When exposed to the humidity test of Example I, the coating is found to be blush-free and firmly adherent, with no migration of plasticizer taking place to cause any oiliness or tackiness.

Example IV

Cellulose propionate sheet stock .010 inch in thickness plasticized with 10 parts by weight of dibutyl phthalate for each 100 parts by weight of cellulose propionate is brushed or sprayed with the following lacquer:

| | Parts by weight |
|---|---|
| Cellulose nitrate (40 sec. viscosity) | 100 |
| Ethyl alcohol (associated with cellulose nitrate | 50 |
| Mono-ethyl ether of ethylene glycol | 800 |
| Secondary butyl alcohol | 800 |
| "V. M. and P." naphtha | 650 |
| Color | q. s. |

A smooth blush resistant and adherent lacquer coating is formed on the cellulose propionate sheet stock and no surface attack is observed.

It is to be understood that the foregoing detailed description is given merely by way of illustration and that many variations may be made therein without departing from the spirit of our invention.

Having described our invention, what we desire to secure by Letters Patent is:

1. Cellulose propionate materials coated with a firmly-adherent, blush-resistant coating deposited from a lacquer consisting essentially of 100 parts by weight of cellulose nitrate dissolved in 350 to 800 parts by weight of a medium boiling volatile solvent for the cellulose nitrate, 350 to 800 parts by weight of a lower aliphatic alcohol diluent having at most five carbon atoms which is a latent solvent for the cellulose nitrate and 300 to 650 parts by weight of a non-solvent aliphatic petroleum hydrocarbon diluent.

2. Cellulose propionate materials coated with a firmly-adherent, blush-resistant coating deposited from a lacquer consisting essentially of 100 parts by weight of cellulose nitrate dissolved in 350 to 800 parts by weight of butyl acetate, 350 to 800 parts by weight of butyl alcohol and 300 to 650 parts by weight of a non-solvent aliphatic petroleum hydrocarbon diluent.

3. Cellulose propionate materials coated with a firmly-adherent, blush-resistant coating deposited from a lacquer consisting essentially of 100 parts by weight of cellulose nitrate dissolved in 350 to 800 parts by weight of amyl acetate, 350 to 800 parts by weight of butyl alcohol and 300 to 650 parts by weight of a non-solvent aliphatic petroleum hydrocarbon diluent.

4. Cellulose propionate materials coated with a firmly-adherent, blush-resistant coating deposited from a lacquer consisting essentially of 100 parts by weight of cellulose nitrate dissolved in 350 to 800 parts by weight of the mono-ethyl ether of ethylene glycol, 350 to 800 parts by weight of secondary butyl alcohol and 300 to 650 parts by weight of a non-solvent aliphatic petroleum hydrocarbon diluent.

5. A lacquer composition for coating cellulose propionate plastic materials, consisting essentially of 100 parts by weight of cellulose nitrate dissolved in 350 to 800 parts by weight of the mono-ethyl ether of ethylene glycol, 350 to 800 parts by weight of secondary butyl alcohol and 300 to 650 parts by weight of a non-solvent aliphatic petroleum hydrocarbon diluent.

ALAN P. BARUCH.
RALPH E. PORZER.

REFERENCES CITED

The following references are of record in the file of this patent:

UNITED STATES PATENTS

| Number | Name | Date |
|---|---|---|
| 471,422 | Hale | Mar. 27, 1892 |
| 728,063 | Wilson | May 12, 1903 |
| 1,321,611 | Flaherty | Nov. 11, 1919 |
| 1,341,710 | Flaherty | June 1, 1920 |
| 1,356,440 | Flaherty | Oct. 19, 1920 |
| 1,702,181 | Van Schaach | Feb. 12, 1929 |
| 2,022,331 | Wilson | Nov. 26, 1935 |
| 2,025,811 | Dorian | Dec. 31, 1935 |

FOREIGN PATENTS

| Number | Country | Date |
|---|---|---|
| 158,586 | Great Britain | Feb. 17, 1921 |